United States Patent [19]
Jaegers et al.

[11] Patent Number: 5,804,030
[45] Date of Patent: *Sep. 8, 1998

[54] APPARATUS FOR MAKING PRESTRESSED HONEYCOMB

[75] Inventors: Robert E. Jaegers, Lake Zurich, Ill.; Rueben C. Carder, Michigan City, Ind.; William B. Woodward, Jr., Irving, Tex.; Robert R. Reed, Wallingford, Conn.

[73] Assignee: Hexacomb Corporation, Lake Forest, Ill.

[ * ] Notice: The term of this patent shall not extend beyond the expiration date of Pat. No. 5,540,972.

[21] Appl. No.: 553,582

[22] PCT Filed: May 26, 1994

[86] PCT No.: PCT/US94/05950

§ 371 Date: Mar. 18, 1996

§ 102(e) Date: Mar. 18, 1996

[87] PCT Pub. No.: WO94/27814

PCT Pub. Date: Dec. 8, 1994

Related U.S. Application Data

[63] Continuation-in-part of Ser. No. 70,097, May 28, 1993, Pat. No. 5,540,972.

[51] Int. Cl.⁶ .................................................. B32B 3/12
[52] U.S. Cl. .................. 156/510; 52/793.1; 428/116; 493/966
[58] Field of Search ...................... 156/510, 558; 493/355, 966; 52/793.1; 428/73, 116, 118

[56] References Cited

U.S. PATENT DOCUMENTS

| | | | |
|---|---|---|---|
| Re. 11,769 | 9/1899 | Mallett | 100/80 |
| 2,720,948 | 10/1955 | Pajak | 428/116 X |
| 2,728,479 | 12/1955 | Wheeler | 217/35 |
| 2,731,379 | 1/1956 | Wheeler | 156/558 |
| 3,481,813 | 12/1969 | Wiggers | 156/211 |
| 3,890,108 | 6/1975 | Welsh | 428/116 X |
| 3,910,485 | 10/1975 | Wandel | 229/199 X |
| 4,067,442 | 1/1978 | Howe | 206/433 |

(List continued on next page.)

FOREIGN PATENT DOCUMENTS 2277709  4/1993  United Kingdom .

OTHER PUBLICATIONS

Apr. 19, 1988 International Honeycomb sketches.
Hexacomb Corporation product brochure.
Hexacomb Corporation Application Sheet for a honeycomb heavy machinery parts pack.
Hexacomb Corporation brochure for a honeycomb computer mainframe chassis pack.
Hexacomb Corporation brochure for a honeycomb CRT picture tube pack.
Article entitled "Honeycomb Pack Ships Well For Mercury Marine" from *Packaging Digest*, May 1993.

*Primary Examiner*—Henry F. Epstein
*Attorney, Agent, or Firm*—Arnold, White & Durkee

[57] ABSTRACT

An apparatus for forming a resilient prestressed honeycomb structure from a honeycomb structure having opposed hollow-ell faces defining opposed planar surfaces. The apparatus comprises a conveyor for conveying the honeycomb structure and a compression apparatus for compressively deforming at least a portion of the honeycomb structure. When the honeycomb structure is conveyed past the compression apparatus, the compression apparatus compressively deforms one of the planar surfaces of the honeycomb structure to form a resilient prestressed cushioned face portion. The compression apparatus comprises a plurality of parallel and elongate compression rolls for compressively deforming the honeycomb structure to form the resilient prestressed cushioned face portion. The compression apparatus further comprises a roll height adjuster for positioning the compression rolls at different heights to incrementally compress the planar surfaces of the honeycomb structure when the honeycomb structure is conveyed past the compression rolls.

21 Claims, 6 Drawing Sheets

U.S. PATENT DOCUMENTS

| | | | |
|---|---|---|---|
| 4,194,313 | 3/1980 | Downing | 40/610 |
| 4,229,243 | 10/1980 | Ellinor | 156/269 |
| 4,467,497 | 8/1984 | Peterson et al. | 100/153 X |
| 5,169,651 | 12/1992 | Heiber et al. | 425/335 |
| 5,175,041 | 12/1992 | Webb et al. | 428/116 |
| 5,180,619 | 1/1993 | Landi et al. | 428/116 |
| 5,462,171 | 10/1995 | Moog et al. | 206/592 |
| 5,466,211 | 11/1995 | Komarek et al. | 493/355 |
| 5,540,972 | 7/1996 | Jaegers et al. | 428/116 |

APPARATUS FOR MAKING PRESTRESSED HONEYCOMB

RELATED APPLICATION

This application is a continuation-in-part of Ser. No. 070,097, filed May 28, 1993 now U.S. Pat. No. 5,540,972.

TECHNICAL FIELD

This invention relates to a prestressed honeycomb structure, a method and apparatus for forming such prestressed honeycomb structure and manufacturing articles from such prestressed honeycomb structure and, in particular, to a prestressed paper honeycomb structure having at least one substantially continuous resilient cushioned face.

BACKGROUND OF THE INVENTION

One of the areas of increasing and serious public concern is the disposal of environmental solid waste. Contributing to this disposal concern is the growing amount of expendable packaging materials, and plastic packaging materials in particular. A large part of solid waste consists of plastic packaging, of which about one-third are cushioning materials used to support and protect relatively fragile contained articles. One of the most common of these is expanded polystyrene.

There are numerous articles which are either nonself-supporting or which require adequate cushioning support of protruding contours, edges and surfaces to prevent damage and breakage from sideways movement or from external compression and hence loss. This need is particularly great to prevent breakage and loss from shifting of electronic instruments, glass, porcelains and other like relatively delicate articles in transit or movement. Consequently, many manufacturers are looking for environmentally friendly, yet inexpensive, replacements which are alternatives to plastic in the area of inner packaging, in particular.

There is also an ongoing need for a lightweight, yet strong material suitable for filling the void space around a contained article and to protectively cushion the article from damage during storage or shipment. This need has been fulfilled to some extent by plastic cushioning materials, such as moldable polyethylene copolymer, expanded foams of polyethylene or polystyrene, styrene acrylonitrile, and polyurethane, polyethylene air bubble packaging, polystyrene "popcorn" and "peanuts", and cellulose-based cushioning materials like curled wood shavings, popcorn, crumpled, shredded or corrugated paper and kraft honeycomb structures.

However, many of the cushioning materials are either not recyclable, or even if recyclable, tend to be expensive and lack the combined lightness, strength and rigidity provided by a paper honeycomb structure. Because of its great supportive strength and durability in combination with its lightness, low cost and recyclability, a paper honeycomb structure has long been desirably employed for material handling and protective packaging.

Paper honeycomb structures are typically made of kraft and can distribute weight evenly to support static loads to about 12,000 pounds and dynamic loads to about 3,000 pounds. Specifically, a paper honeycomb structure provides a lower cost, thicker protective reinforcing material with higher strength than that provided by corrugated structures made of comparable kraft. The term "corrugated" is intended to refer to the well-known reinforcing material consisting of a series of parallel elongated crests, commonly called flutes, to which inner and outer paper liners are typically secured. More importantly, a paper honeycomb structure is also a recyclable article and, thus, is a desirable environmentally friendly, inexpensive, lightweight and strong alternative to plastic.

In particular, void fillers and interior packaging for protecting relatively delicate products, typically having a fragility requiring moderate protection against about 40 to about 85 peak deceleration (G's) should desirably cushion against damage or breakage from multiple impact. However, while biodegradable materials, including conventional paper honeycomb structures, generally offer adequate supportive protection against a single impact, they show limited protection against multiple impacts. For example, as a cushioning material, a conventional paper honeycomb structure ordinarily affords generally adequate protection against single impacts at moderate levels of protection, but its shock absorbing characteristics for multiple impacts require more weight and more volume than do polymeric cushioning materials.

Thus, there is still a need, therefore, for an economical protective resilient inner packaging material that can cushion against multiple impacts, yet is preferably as strong, lightweight, inexpensive and recyclable as a paper honeycomb structure. The resilient prestressed honeycomb structure prepared by the method and apparatus of the present invention meets these needs.

SUMMARY OF THE INVENTION

The present invention relates to a resilient prestressed honeycomb structure comprising opposed hollow-cell faces defining planar surfaces in which at least one planar surface is substantially continuously laterally cushioned to a predetermined depth. Also disclosed is a one-step method and a first apparatus for simultaneously cutting and forming a resilient prestressed paper honeycomb structure in accordance with this invention. Further disclosed is a second apparatus for incrementally laterally deforming the planar surface to form a resilient prestressed paper honeycomb structure.

The terms "resilient prestressed honeycomb structure" and "prestressed honeycomb" are used interchangeably herein to define a paper honeycomb structure in which one of its hollow-cell faces has been substantially continuously deformed along its lateral length to a predetermined depth under the compressive conditions disclosed herein to provide it with a resilient prestressed cushioned face portion.

The cushioned face portion of the resilient prestressed paper honeycomb structure embodiment surprisingly increased the shock absorbance to multiple impact and also reduced the amount of weight and volume of honeycomb structure ordinarily required for a given G-level rating of protection against even a single impact. Moreover, prestressed honeycomb retains the desirable benefits of strength, durability, economy and recyclability associated with paper honeycomb structures.

Resilient prestressed paper honeycomb structures can be advantageously prepared from conventional paper honeycomb structures which have been conditioned prior to prestressing by the method and apparatus disclosed herein.

In a preferred method of the embodiment, the resilient prestressed paper honeycomb structure is formed by first exposing a conventional paper honeycomb structure of preselected thickness and length to a drying or humidifying conditioning environment for a period sufficient to condition the paper honeycomb structure. Briefly described, the paper honeycomb structure is conditioned to a predetermined moisture level at which the paper honeycomb is judged to be compressible yet structurally substantially rigid and strong.

The conditioned paper honeycomb is then removed from the conditioning environment and thereafter can, in one step, using one of the disclosed apparatus, be simultaneously cut to a predetermined size and shape and deformed laterally substantially continuously along one of the planar surfaces of its hollow-cell faces to a predetermined depth to form the prestressed cushioned face portion. Alternatively, the paper honeycomb can be incrementally laterally deformed first using the other disclosed apparatus and then cut to a predetermined size or cut first and then incrementally laterally deformed.

On release of compression, the prestressed face portion retains sufficient memory to uniformly cushion substantially all surfaces of a body in contact therewith. The surfaces of a body can be the exterior surfaces of articles or the walls of cartons, such as boxes for shipping and storage. The term "memory" as used herein refers to the capacity of the cushioned face portion of the prestressed honeycomb structure to partially recover from the depth to which it was deformed.

In various preferred embodiments, the resilient prestressed paper honeycomb structure can include a paper face sheet secured to one or both of its cushioned face portions either before or after being prestressed by the disclosed method. In another embodiment, the face sheet or the partition walls of the honeycomb core comprising the honeycomb structure may be air-permeable, such as by forming perforations therein, to allow the flow of air through the face sheet or partition walls when the honeycomb structure is compressively deformed.

Additionally, pads of prestressed honeycomb of variable thicknesses which have been prestressed to the same or different depth can be combined to form custom fit inner packs which are environmentally friendly.

The disclosed resilient prestressed honeycomb structure offers the benefit of a lightweight yet sufficiently strong material which effectively cushions against multiple impacts. Another benefit is that the resilient prestressed paper honeycomb structure is recyclable and inexpensive. Thus it offers the advantages of improved package protection and reduced size which results in a savings in storage area and lower cost packaging combined with an environmentally friendly recyclable packaging.

BRIEF DESCRIPTION OF THE DRAWINGS

In the accompanying drawings, which form a portion of this disclosure.

DESCRIPTION OF THE PREFERRED EMBODIMENTS

For convenience, the terms "resilient prestressed honeycomb structure" and "prestressed honeycomb" will be used interchangeably to refer to paper honeycomb structures in which the planar surface of one of the hollow-cell faces has been substantially continuously deformed along its lateral length to a predetermined depth under the compressive conditions disclosed herein to provide it with a prestressed resilient cushioned face portion.

The terms "paper honeycomb structure" and "honeycomb core" are used herein in their commonly understood meaning as referring to a network of oval or generally hexagonal cells typically secured as by being glued or laminated to one thin high strength face sheet or between two thin high strength face sheets. The honeycomb core is a threedimensional lattice formed by a plurality of abutting partition walls arranged in the configuration of a generally oval or hexagonal honeycomb pattern to define a planar surface comprising opposed hollow-cell faces.

Paper honeycomb structures are commercially available in different sizes of core cells and thickness. For package cushioning materials, useful cell widths can vary from about 0.25 inch (about 0.6 centimeters) to about 1 inch (about 2.5 centimeters) and useful thickness can vary from about 0.25 inch (about 0.6 centimeters) to about 4 inches (about 10 centimeters), but are not limited thereto. It is recognized that paper honeycomb structures having cell widths and thickness that are larger or smaller can be employed and still come within the scope of this invention so long as the honeycomb structure can form prestressed honeycomb as disclosed herein.

Typically, the partition walls of the honeycomb core are constructed from paper, such as unbleached kraft, but other types of paper or paperboard, including recycled fibers, may be employed without departing from the intended scope of the invention. Additionally, the hollow cells can be resin-impregnated for water resistance and other materials such as plastic films can also be employed if desired. As will be appreciated, the width of the cells, the height of the partition walls or the weight of the kraft can all be varied to impart various desired characteristics to the honeycomb material. Typically, at least one face sheet covers one of the hollow-cell faces of a paper honeycomb structure, but is not essential to the practice of this invention. Such face sheets are also preferably made of kraft, though other materials such as plastic films, aluminum and the like can be employed.

In a preferred method embodiment, the resilient prestressed paper honeycomb structure is prepared from a conditioned paper honeycomb structure.

A conventional paper honeycomb structure of preselected thickness and length is first conditioned by exposing it to an environment having a predetermined ambient air temperature and relative humidity. This exposure is maintained for a period sufficient to dry or humidify the paper honeycomb structure to a predetermined moisture level. Depending on the kraft weight, a moisture level was selected at which the conditioned paper honeycomb structure was judged flexible enough to be laterally compressible along the planar surface of at least one of its hollow-cell faces yet structurally substantially strong. For simplicity, the term "conditioned honeycomb" will be used hereafter to refer to such a honeycomb structure whether or not it includes face sheets.

In practice, a useful preferred conditioning environment was found to have an ambient air temperature of from about 85 degrees F. (about 30 degrees C.) to about 95 degrees F. (about 35 degrees C.) and an ambient relative humidity of from about 35% to about 65%. A useful moisture level for the conditioned honeycomb preferably is from about 4 percent to less than about 8 percent, more preferably from about 5 percent to about 7 percent.

The conditioned honeycomb is then removed from the conditioning environment and thereafter is cut and stressed preferably in one step to a predetermined size and shape to provide it with a resilient prestressed cushioned face portion. Alternatively, cutting and stressing are done in separate operations. Preferably, the conditioned honeycomb is prestressed within several hours, more preferably within about an hour, of being removed from the conditioning environment.

As the conditioned honeycomb is being cut, it is simultaneously being deformed laterally substantially continuously along the length of the planar surface of one of its hollow-cell faces. The deformation is achieved by compressing the selected planar surface of the conditioned honeycomb to a predetermined depth with an apparatus having a means for simultaneously cutting and compressing the conditioned honeycomb. Compression is then released and the resulting resilient prestressed honeycomb is removed.

In practice, it was found that, upon releasing the compression, the prestressed cushioned face portion recovers about half of its memory to achieve the desired thickness so the depth of the compression can be readily determined by the desired thickness of the prestressed honeycomb. For example, to obtain a prestressed honeycomb having a thickness of about 3 inches (about 7.5 centimeters), a conditioned honeycomb structure that has a thickness of about 4 inches (about 10 centimeters) is compressively deformed to about half of its original thickness.

Any reference to the thickness of the prestressed honeycomb herein, therefore, refers to its thickness after compression is released. In practice, it was found that compressively deforming a conditioned honeycomb to about half of its original thickness produced a fully deformed honeycomb core with substantially no undeformed portion. This type of honeycomb core will be referred to herein as "fully cushioned honeycomb". It was also found that compressively deforming a conditioned honeycomb to less than about half of its original thickness provided a partially deformed honeycomb core, and surprisingly, the portion of the honeycomb core remaining uncushioned retained substantial rigidity and strength. The term "partially cushioned honeycomb" is used herein to describe prestressed honeycomb core having a cushioned face portion on one of its planar surfaces and an opposed uncushioned portion.

Figures 1A, 1B, 2A, 2B, 3:
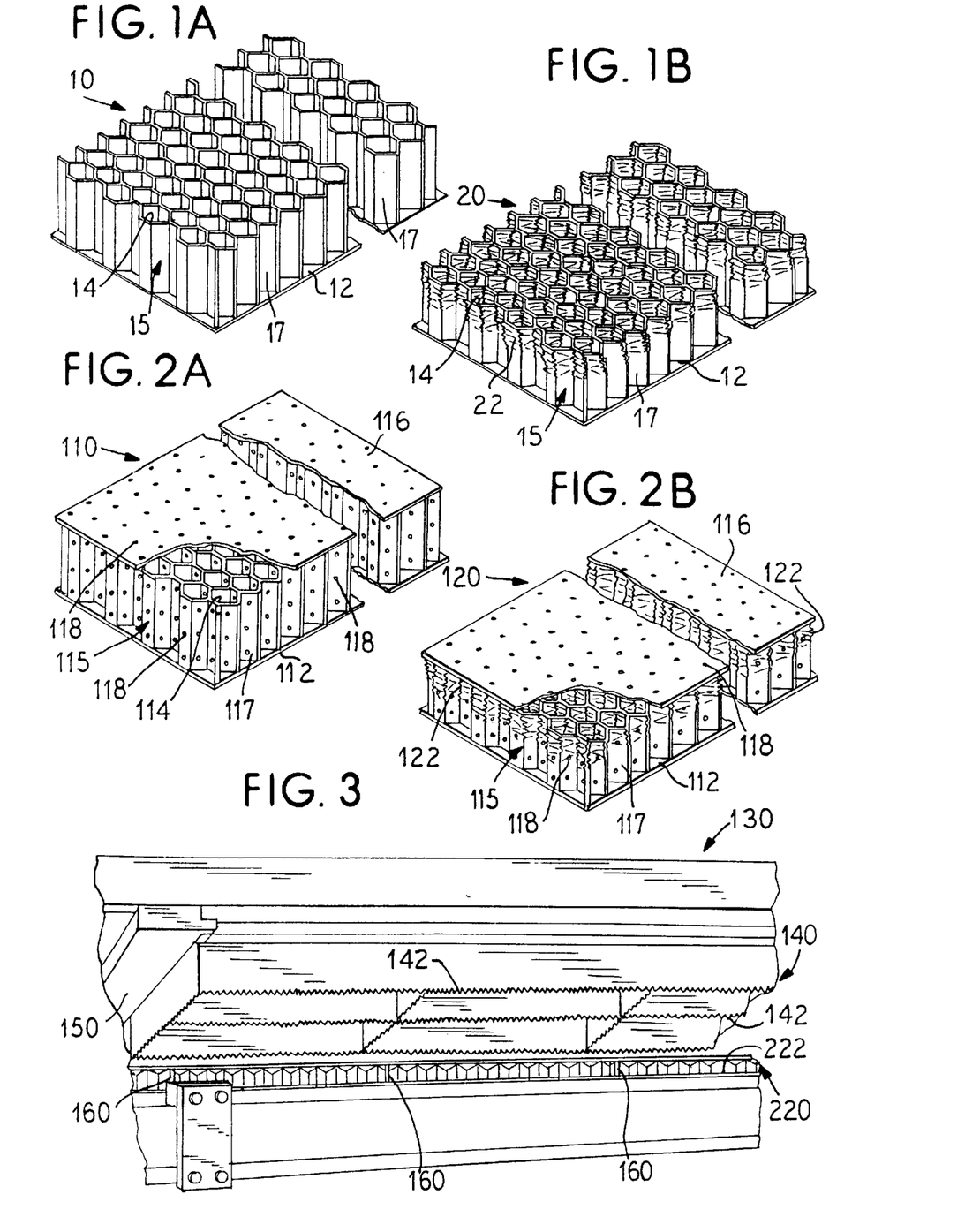
FIG. 1A is a perspective view of a conditioned paper honeycomb structure in the form of a pad having one face sheet illustrated before being compressively prestressed to a resilient honeycomb structure embodiment in accordance with the method of this invention.
FIG. 1B is a perspective view of the cushioned face portion of the resilient prestressed honeycomb embodiment formed from the pad shown in FIG. 1A.
FIG. 2A is a perspective view in partial cutaway of another conditioned and perforated paper honeycomb structure in the form of a block having two opposing face sheets illustrated before being compressively prestressed to a resilient honeycomb structure embodiment in accordance with the method of this invention.
FIG. 2B is a perspective view in partial cutaway of the cushioned face portion of the resilient prestressed honeycomb embodiment formed from the perforated block shown in FIG. 2A.
FIG. 3 is a perspective view of a die cut press used to practice an apparatus embodiment of the present invention.
Figure 4:
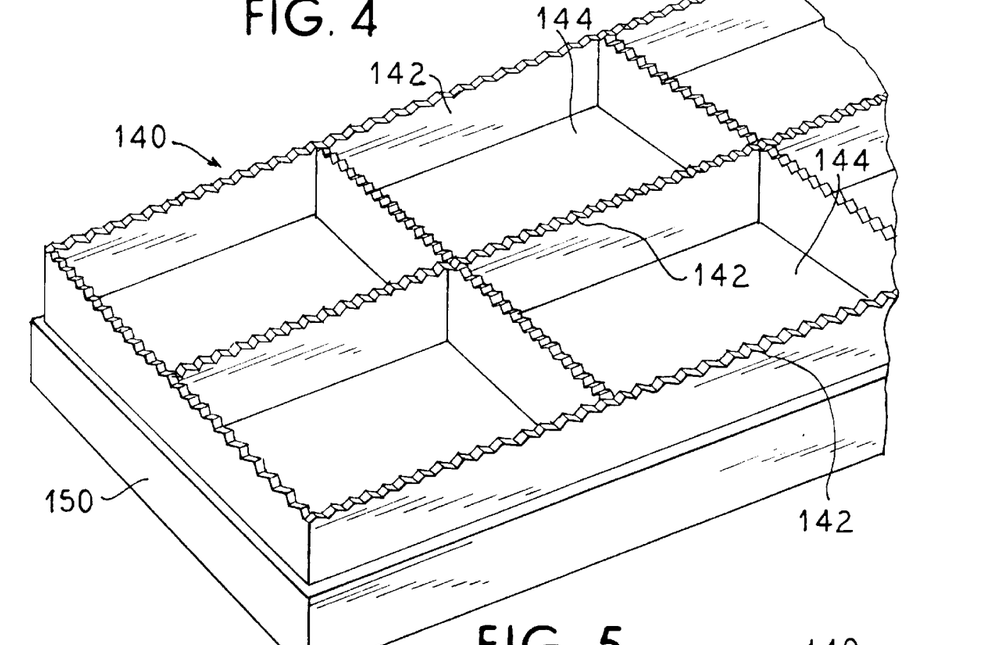
FIG. 4 is a perspective view of a die cutting tool used to practice the apparatus embodiment shown in FIG. 3.

Referring to FIGS. 1A and 1B, a pad of conditioned honeycomb 10 having one face sheet 12 is illustrated before and after being made into prestressed honeycomb 20. The honeycomb 10 includes a honeycomb core 15 comprised of abutting partition walls 17 which form hexagonal cells 14. In this embodiment, the cushioned face portion 22 can be obtained by partially compressing the conditioned honeycomb 10 to a thickness of about three-fourths of its original thickness. For example, a conditioned honeycomb pad having a starting thickness of about 4 inches (about 10 centimeters) is formed into a prestressed honeycomb pad of about 3 inches (about 7.5 centimeters) thickness.

For convenience and not by way of limitation, the conditioned honeycomb 10 in FIG. 1A is illustrated having abutting hexagonal cells 14 each of substantially uniform wall height and width to uniformly distribute any load applied laterally to the continuous hollow cell faces.

In this type of honeycomb structure, the strength provided by the partition walls resists compression up to a predetermined limit of pressure, determined by the dimensions of the hollow cells and the weight of applied load. The application of a force of a predetermined magnitude or greater on the one face of the conditioned honeycomb structure, however, will result in the compression and deformation of the interior hollow cells to form a prestressed cushioned face portion. For use as an inner packaging embodiment, a cell width of about 1 inch (about 2.5 centimeters), preferably about 0.75 inches (about 1.9 centimeters) or less is typically desirable but is not limited thereto.

Turning to FIGS. 2A and 2B, another conditioned honeycomb structure 110 is illustrated in the form of a block having two opposed face sheets 112, 116 before and after being made into prestressed honeycomb 120. The honeycomb structure 110, like structure 10, includes a honeycomb core 115 comprised of abutting partition walls 117 which form hexagonal cells 114. In this embodiment, the resilient cushioned portion 122 can be obtained by partially compressing the conditioned honeycomb structure 110 to a thickness of about two-thirds of its original thickness. For example, a conditioned honeycomb block having a starting thickness of about 3 inches (about 7.5 centimeters) is formed into a prestressed honeycomb block of about 2 inches (about 6 centimeters).

In this embodiment, the partition walls 117 and the face sheets 112 and 116 may include perforations 118 to allow air trapped in the cells 114 to permeate through the perforations 118 when the honeycomb structure 110 is compressed. The perforations 118 allow the relief of air pressure build-up which occurs during compression which, on occasion, has been known to cause the bursting of either the walls 117, the face sheets 112 and 116, or both during compression.

Preferably, each of the perforations 118 is approximately 0.125 inches (0.31 centimeters) in diameter. Preferably, the partition walls 117 of the core 115 include a plurality of rows and columns of perforations 118. Preferably, the perforations 118 in each of the columns are aligned generally vertically to each other and are approximately 1 inch (2.5 centimeters) apart from each other. In the embodiment of FIG. 2A, each of the columns include three vertically disposed perforations 118 since the honeycomb core 115 is 3 inches (7.5 centimeters) thick. Preferably, the perforations 118 in each of the rows are aligned generally horizontally to each other. Although FIG. 2A shows a honeycomb structure 110 wherein each of the partition walls 117 include perforations 118, it is understood that the invention encompasses a honeycomb structure 110 wherein only some of the partition walls 117 include perforations 118. For example, every other sheet of paper used to make the core can be perforated with the other sheets unperforated. Preferably, perforations 118 are formed in least every other abutting partition wall 117.

The face sheet 112 includes a plurality of offsetting or staggered rows and columns of perforations 118. The perforations 118 are spaced from each other at predetermined distances which vary depending upon the cell size of the honeycomb core 115. Preferably, each of the perforations 118 is positioned on the face sheet 112 such that each is aligned generally centrally with a respective cell 114 of the core 115 beneath the face sheet 112. For example, if honeycomb core with a cell size of 0.5 inches (1.25 centimeters) is used, each of the offsetting rows and columns would include perforations 118 spaced approximately 1 inch (2.5 centimeters) apart from each other. For another example, if honeycomb core 115 with a cell size of 0.375 inches (0.9 centimeters) is used, each of the offsetting rows and each of the columns would include perforations 118 spaced approximately 0.75 inches (1.9 centimeters) apart from each other.

Not only perforated face sheets and core can be used but, additionally, face sheets and core which are constructed of an air-permeable or porous paper can be used.

The cutting and compressing of the conditioned honeycomb is preferably made in one step by an apparatus embodiment illustrated as the die-cutting press 130 in FIG. 3 and the die-cutting tool embodiment 140 shown in FIGS. 3–6. The die-cutting tool 140 consists of a knife 142 which projects slightly above the compression plate 144 which are mounted on a support 150 in the die-cutting press 130. Knife edges, such as serrations, perforations, and the like may be used and the depth of the compression can be varied by the positioning of the distance of the knife edge relative to the face of the compression plate 144. A useful press can be a 150 ton punch press.

Figure 5:
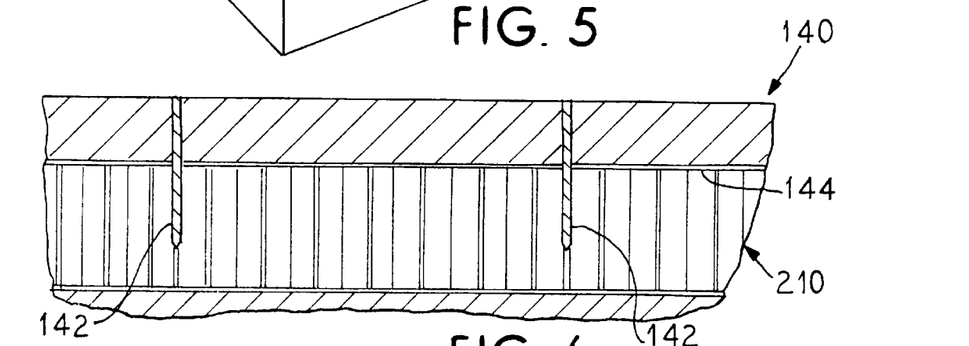
FIG. 5 is a side view of the die cutting tool embodiment shown in FIG. 4 cutting through a conditioned honeycomb structure.
Figure 6:
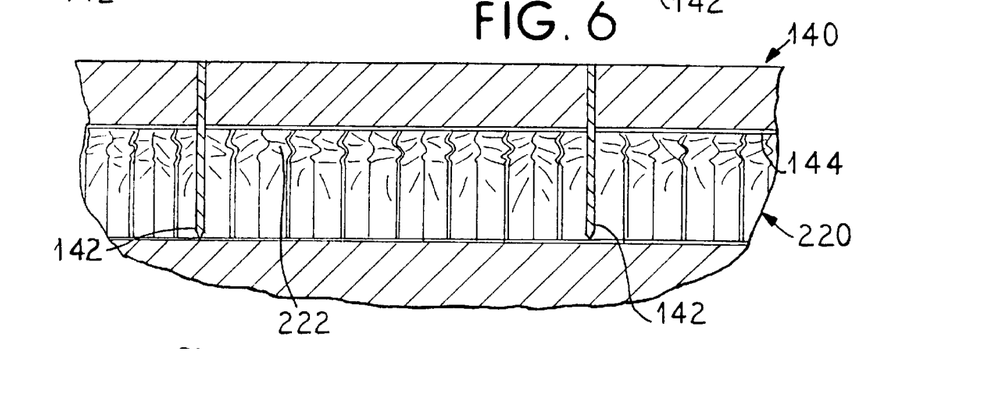
FIG. 6 is a side view of the conditioned honeycomb structure seen in FIG. 5 being prestressed to form a cushioned face portion.

As illustrated in FIGS. 5 and 6 when the die-cutting tool 140 is brought down upon a conditioned honeycomb structure 210, the knives 142 cut through its core and any face sheet present and substantially simultaneously compress it laterally along the planar surface of the face in contact with the moving compression plate 144 to the predetermined depth. Thus the prestressed honeycomb 220 forms with the resilient cushioned face portion 222 and the desired shape is obtained in one step. FIG. 3 illustrates one embodiment of a completed prestressed honeycomb panel 220 having multiple cuts 159a made by the apparatus 130 in one step. In practice, this one-step die-cut and prestressing step can be done in about 0.5 seconds, when a 150 ton punch press is used. The cushioned face portion 222 obtained can provide substantially uniform shock absorbance for a contacted article against further applied compressive load or impact.

Figure 7:
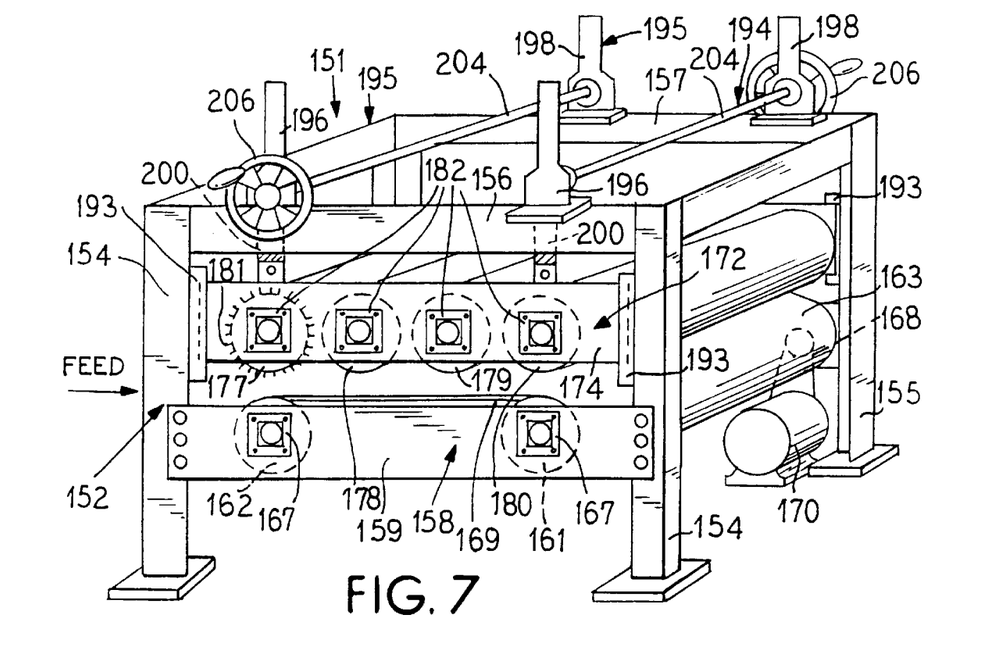
FIG. 7 is a perspective view of another apparatus embodiment of the present invention.
Figure 8:
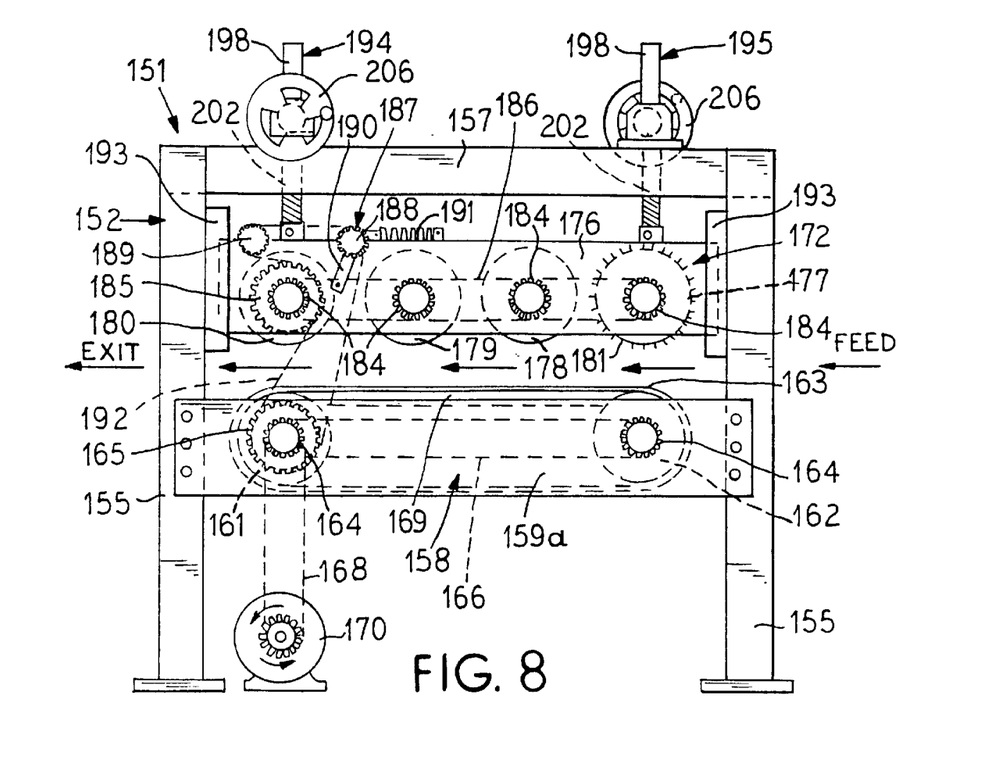
FIG. 8 is a side elevational view of the rear of the apparatus embodiment depicted in FIG. 7.
Figure 9:
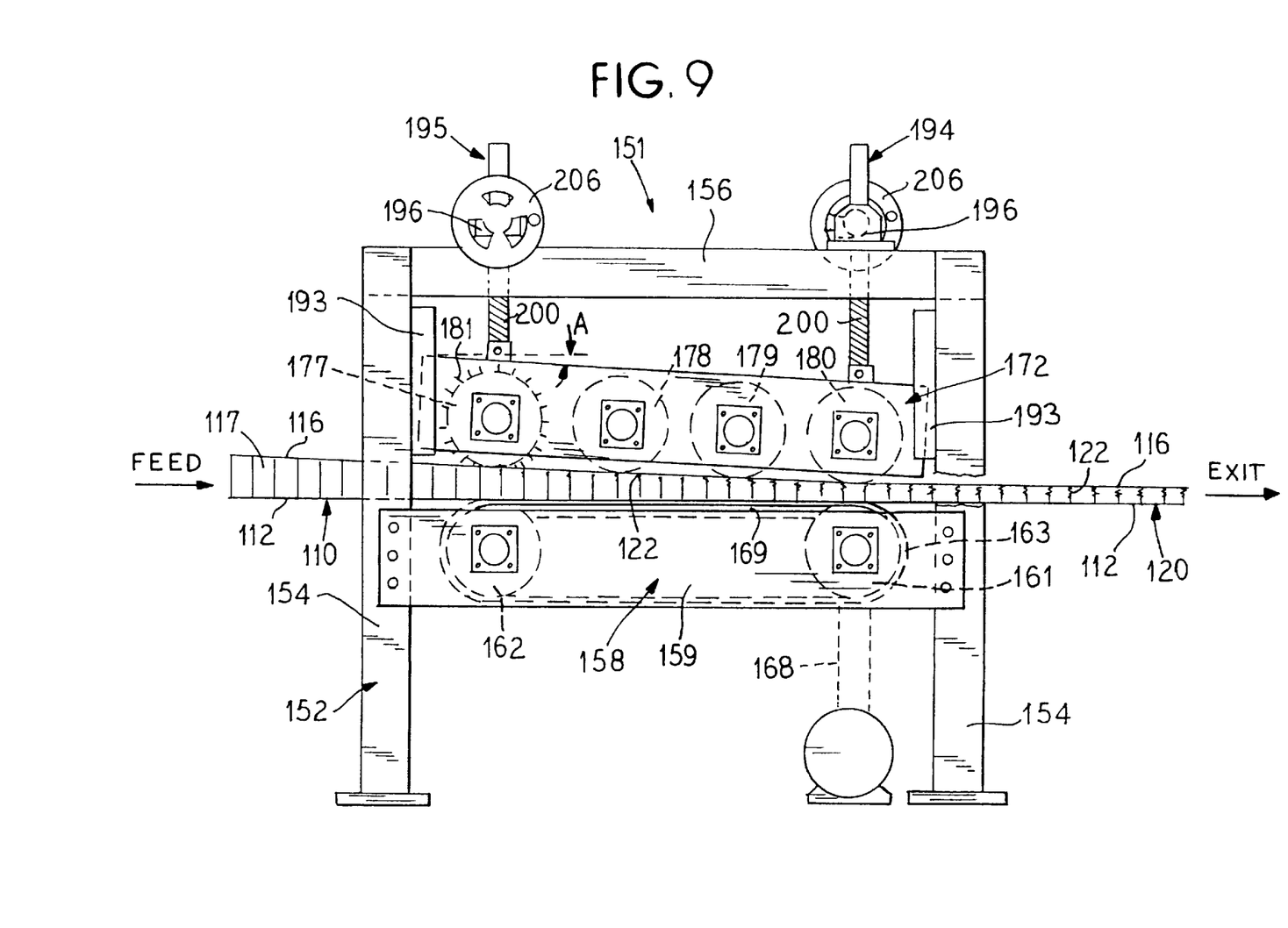
FIG. 9 is a side elevational view of the front of the apparatus depicted in FIG. 7, which shows a honeycomb structure, in vertical cross-section, being incrementally laterally deformed.

FIGS. 7–9 depict another apparatus, generally designated 151, for incrementally laterally compressively deforming honeycomb structure to form resilient prestressed honeycomb structure.

Referring to FIGS. 7 and 8, the apparatus 151 comprises a support frame 152 including two elongate and upstanding front legs 154, two elongate and upstanding rear legs 155 and two horizontal support members 156 and 157 extending transversely between the legs 154 and 155, respectively. A honeycomb conveyor structure 158 is secured to the lower portion of the support frame 152 and, more particularly, to the lower portion of the legs 154 and 155. The conveyor structure 158 includes a pair of horizontal trusses 159 and 159a extending the length of the support frame 152 and transversely to legs 154 and 155.

The ends of the truss 159 are secured to the front legs 154 while the ends of the truss 159a are secured to the rear legs 155. A pair of spaced apart and parallel rolls 161 and 162 extend between and transversely to the trusses 159 and 159a. A conveyor belt 163 surrounds rolls 161 and 162. A horizontal support table 169, positioned below the conveyor belt 163, extends longitudinally between the rolls 161 and 162 and transversely the width of the support frame 152. Each of the rolls 161 and 162 is journalled for rotation on bearings 167. Each of the rolls 161 and 162 has a drive sprocket 164 at one end. Although not shown in any of the figures, it is noted that drive sprocket 164 on roll 161 has two parallel sets of teeth. The roll 161 includes another drive sprocket 165 at the same end including drive sprocket 164. The drive sprocket 165 has a diameter greater than the diameter of drive sprocket 164. A drive chain 166 surrounds the drive sprockets 164 for connecting the two rolls 161 and 162 together for coupled and simultaneous rotation.

A chain drive 168, associated with drive motor assembly 170, surrounds drive sprocket 164 on roll 161. The drive chain 166 surrounds one set of teeth on drive sprocket 164 while the chain drive 168 surrounds the other set of teeth on drive sprocket 164. According to the invention, the drive motor assembly 170 drives the chain drive 168 which drives the roll 161 which, via drive chain 166, drives roll 162 thereby causing the rotational movement of conveyor belt 163.

The apparatus 151 further comprises a compression apparatus such as a compression roll frame 172 including a pair of horizontal trusses 174 and 176 which extend the length of support frame 152 and between the legs 154 and 155, respectively. The ends of truss 174 are secured to the upper portion of the two front legs 154 while the ends of truss 176 are secured to the upper portion of the two rear legs 155. Spaced apart and parallel elongate cylindrical compression rolls 177–180 extend between and transversely to the trusses 174 and 176. In the embodiment shown, cylindrical rolls 177–180 have a constant radius along the full width thereof. Each of the compression rolls 177–180 is journalled for rotation on bearings 182. Moreover, each of the compression rolls 177–180 may be mounted on trusses 174 and 176 so as to be vertically independently adjustable thereon to allow the positioning of the compression rolls 177–180 at incrementally different heights with respect to the horizontal table 169 and conveyor belt 163. The compression roll 177 may include a plurality of needles or pins 181, or other suitable puncture means, extending radially outwardly from the outer surface which allows the perforation of the face sheet 116 to improve compression.

Attached to one end of each of the compression rolls 177–180 is a drive sprocket 184. The compression roll 180 includes another drive sprocket 185 at the same end including drive sprocket 184. The drive sprocket 185 has a diameter greater than the diameter of drive sprocket 184. A drive chain 186 surrounds the drive sprockets 184 thereby connecting the four compression rolls 177–180 together for coupled and simultaneous rotation. An idler 187 is connected to the outer surface of truss 176 and is operatively associated with the drive sprocket 185 on compression roll 180. The idler 187 includes idler gears 188 and 189, an idler pivot arm 190 and an idler spring 191. The gear 188 is connected to the end of the pivot arm 190 and, additionally, is connected to and operatively associated with the spring 191.

A chain drive 192 surrounds the drive sprocket 165 on the roll 161, the gears 188 and 189 and a portion of drive sprocket 185 on compression roll 180. According to the invention, drive motor assembly 170 drives the chain drive 168 which drives the chain drive 192 which, via idler 187, drives compression roll 180 which in turn, via drive chain 186, drive compression rolls 177–179.

A gib 193 is secured to each of the legs 154 and 155. Each end of the trusses 174 and 176 is positioned within each of the gibs 193 respectively to allow the vertical movement of the roll frame 172 with respect to the support frame 152 while, at the same time, preventing the horizontal movement of the roll frame 172 with respect to the support frame 152.

The apparatus 151 further comprises a pair of roll height adjusters 194 and 195. Each of the roll height adjusters 194 and 195 include first and second collars 196 and 198 fixed respectively to the horizontal support members 156 and 157 of support frame 152. Each of the roll height adjusters 194 and 195 further include first and second vertically extending posts 200 and 202. One end of the posts 200 and 202 extends through the first and second collars 196 and 198, respectively. The other end of the posts 200 and 202 are secured to the trusses 174 and 176, respectively.

Each of the roll height adjusters 194 and 195 further include an elongate and rotatable connector shaft 204 extending horizontally between and operatively associated with the collars 196 and 198. A manually operable and rotatable wheel or handle 206 is connected to one end of the shaft 204.

The manual rotation of wheels 206 causes the rotation of the shafts 204 which causes the simultaneous and coupled vertical movement of posts 200 and 202 which in turn causes the vertical displacement of the ends of the roll frame 172. The roll height adjusters 194 and 195 are independently operable to allow for the independent and varying vertical displacement of the ends of roll frame 172 so that roll frame 172 may be angularly displaced with respect to the support frame 152 and the horizontal table 169. The mechanism associated with collars 196 and 198 and posts 200 and 202 for converting the rotary motion of shafts 204 into the vertical movement of posts 200 and 202 may comprise any suitable mechanism including, but not limited to, the use of a worm gear in collars 196 and 198 cooperating with teeth on posts 200 and 202.

Referring to FIG. 9, the apparatus 151, and more particularly, the adjustable roll frame 172 thereon, allows for the incremental lateral compression of the honeycomb structure as it is conveyed past the compression rolls 177–180 to form a prestressed honeycomb structure. Prestressed honeycomb structure is formed with the apparatus 151 as described below. Initially, the roll frame 172 is positioned at a predetermined height and angle with respect to the support frame 152 and horizontal table 169. Alternatively, each of the compression rolls 177–180 may be adjusted vertically such that they are positioned at incrementally different heights with respect to the horizontal table 169. Thereafter, honeycomb structure, such as the honeycomb structure 110 shown in FIG. 2A, is placed on the conveyor belt 163 and thereafter conveyed by the belt 163 past the compression rolls 177–180.

Due to the angular displacement of the roll frame 172 or, alternatively, the individual adjustment of compression rolls 177–180, each of the compression rolls 177-180 will be positioned at an incrementally different height with respect to the horizontal table 169 and the top planar surface of the honeycomb structure 110. As a result, compression roll 177 compresses the entire top planar surface of the honeycomb structure to a first uniform depth while successive compression rolls 178–180 further laterally compress the entire planar surface of the honeycomb structure 110 to incrementally greater uniform depths until the honeycomb structure 110 passes through all of the compression rolls 177–180 and the honeycomb structure 110 has been formed into a prestressed honeycomb structure such as the prestressed honeycomb structure 120 shown in FIG. 2B. The horizontal support table 169 supports and prevents the buckling of the honeycomb structure 110 as it is compressed and conveyed through the apparatus 151. The compression roll 177 not only compresses the honeycomb structure but preferably also, by means of pins or needles 181, punches perforations in the surface of the face sheet 116 of the honeycomb structure as the honeycomb structure is conveyed past the compression roll 177.

As an example, to form a prestressed honeycomb structure 120 having a thickness of 3 inches (7.6 centimeters) from a honeycomb structure 110 having a thickness of 3.5 inches (8.75 centimeters), the end of roll frame 172 adjacent the front legs 154 of support frame 152 would be positioned approximately 2.5 inches (6.25 centimeters) away from the horizontal table 169 at an angle A of approximately 20 degrees, with respect to the front leg 154, such that the planar surface of the honeycomb structure 110 is incrementally laterally deformed a total depth of approximately 1 inch (2.5 centimeters). Alternatively, the same 1 inch incremental lateral compression can be accomplished by positioning the roll frame 172 horizontally approximately 3.5 inches (8.75 centimeters) away from the horizontal table 169 and then positioning each of the compression rolls 177–180 respectively a distance of approximately 3.25, 3.0, 2.75, 2.50 inches (8.12, 7.50, 6.87, 6.25 centimeters) away from the horizontal table 169. The apparatus 151 would be positioned to deform the honeycomb structure a depth of 1 inch, rather than 0.5 inches, since a cushioned face portion recovers approximately half of its memory, i.e., 0.5 inches (1.3 centimeters) after compression.

Although the compression rolls 177–180 depicted in FIGS. 7–9 are mounted on a single integral compression roll frame 172, it is understood that each of the rolls 177–180 may be mounted on its own separate compression roll frame and operatively associated with four roll height adjusters respectively, such as roll height adjusters 194 and 195, so as to be vertically independently adjustable to allow the positioning of the rolls 177–180 at incrementally different heights with respect to the horizontal table 169 and conveyor belt 163.

The apparatus 151 may be made longer than as show in FIGS. 7–9 to allow the positioning of rolls 177–180 further apart than as presently shown to further minimize the possibility of buckling of the honeycomb structure as it is conveyed through and compressed in the apparatus 151.

The incremental lateral compression of the honeycomb structure is advantageous because it eliminates the uneven deformation and damage to the partition walls of the honeycomb core which occasionally results when the planar surface is compressed to a predetermined depth in one step as with, for example, the apparatus 130. The incremental compression allows for the gradual and incremental application of pressure to the partition walls, thus minimizing the possibility of uneven deformation and damage thereto. Moreover, the incremental and gradual application of pressure coupled with the formation of perforations in the face sheet of the honeycomb structure minimizes the possibility of bursting of the partition walls or face sheets which occasionally occurs when the honeycomb structure is compressed in one step.

The apparatus 151 may be used independently of any other apparatus or, alternatively, as a modular addon component to existing lines for making honeycomb structure.

Figures 10A, 10B, 11A, 11B, 11C:
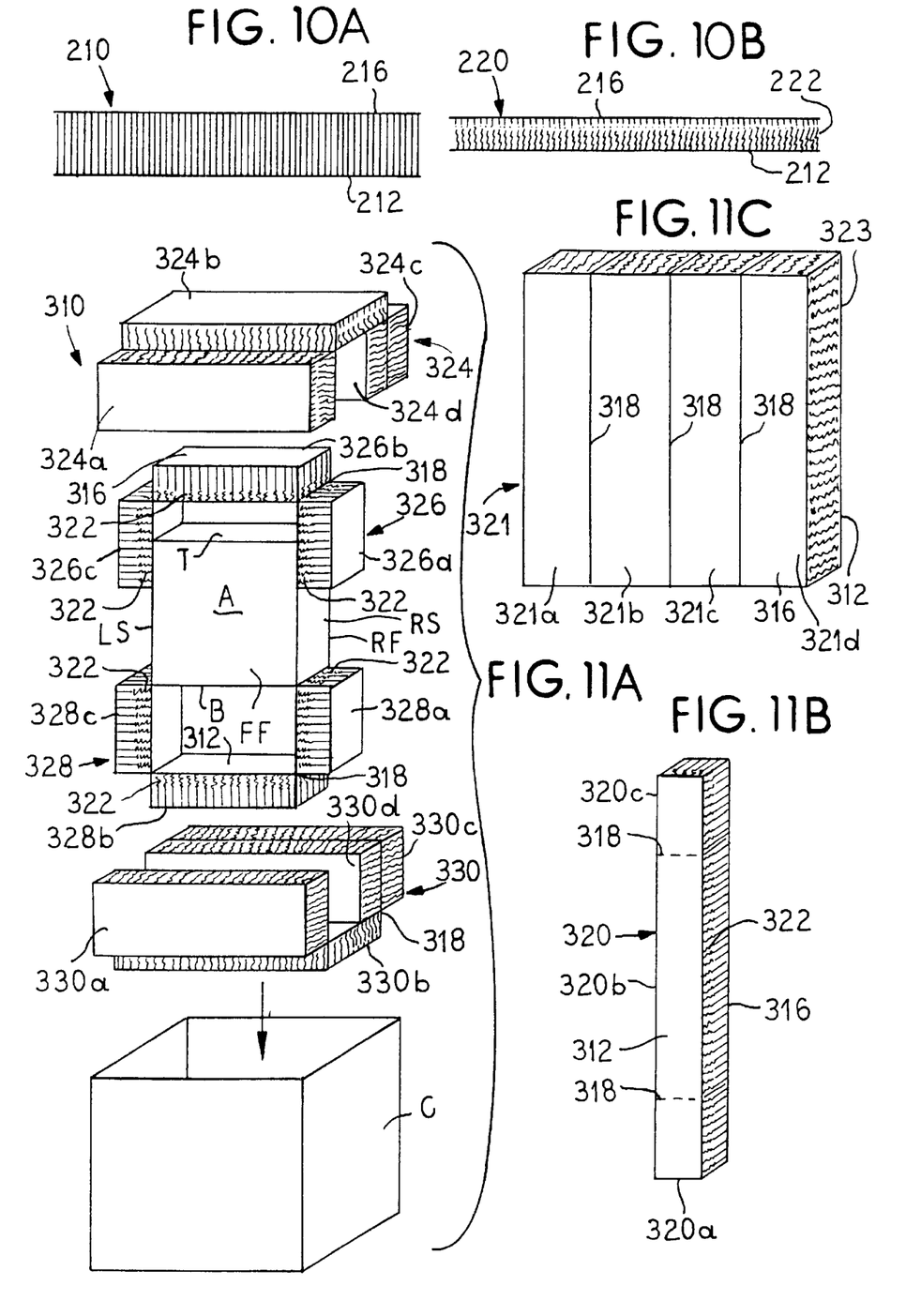
FIG. 10A is a side view of another conditioned paper honeycomb structure in the form of a panel having two opposed face sheets illustrated before being compressively prestressed to a resilient honeycomb structure embodiment in accordance with the method of this invention.
FIG. 10B is a side view of the resilient prestressed honeycomb embodiment formed from the panel shown in FIG. 10A.
FIG. 11A is an exploded elevational view of an inner packaging embodiment illustrated as a multipiece assembly of custom fit resilient prestressed honeycomb pads formed and prestressed to different depths in accordance with the method and by the apparatus of this invention.
FIG. 11B is a perspective view of a prestressed honeycomb blank embodiment which has been score slit in two places for use as a pad embodiment of the assembly of the inner packaging shown in FIG. 11A.
FIG. 11C is a perspective view of another prestressed honeycomb blank embodiment which has been score slit in three places for use as another pad embodiment of the assembly of the inner packaging shown in FIG. 11A.

In FIGS. 10A and 10B, the side view of the conditioned honeycomb structure 210 is illustrated in the form of a panel having two face sheets 212, 216 before and after being fully cushioned to form the prestressed honeycomb 220. As described earlier, the fully cushioned face portion 222 can be obtained by compressing the conditioned honeycomb structure 210 to about half of its original thickness. For example, a conditioned honeycomb panel having a starting thickness of about 3 inches (about 7.5 centimeters) forms a prestressed honeycomb panel of about 1.5 inches (about 3.8 centimeters).

A honeycomb structure for pads, blocks or panels can be composed of any useful kraft, bleached or unbleached, new or recycled, and any pound weight strength. For example, a useful facing sheet can be made of kraft classified as being about 26 pound weight to about 90 pound weight and a useful cell core can be made of kraft classified as being about 26 pound weight to about 42 pound weight. The facing sheets can be secured to one or both faces as by gluing either before the prestressing step or to the prestressed honeycomb.

Additionally, the planar surface of the resilient cushioned face portion of the prestressed honeycomb can define an irregular surface, as by leaving its honeycomb core unfaced as illustrated in FIGS. 1A and 1B. Alternatively a non-linear planar surface can be defined by angularly compressing the honeycomb structure or by compressing it to variable depths along its lateral axis by providing each of the rolls 177–180 of apparatus 151 with a varying radius along the width thereof to correspondingly vary the depth of compression of the honeycomb structure or by further punch cutting or die cutting to provide cushioned face cavities and hinged sections. All of the foregoing still come within the scope of this invention, so long as at least a portion of the planar surface includes a partially or fully cushioned face portion.

FIGS. 11A, 11B and 11C illustrate an inner packaging embodiment 310 composed of an assembly of the four prestressed honeycomb pads, 324, 326, 328, and 330, each formed and shaped from prestressed honeycomb by the method and apparatus of this invention. By way of illustration and not by way of limitation, the inner packaging embodiment 310 custom fits an article A having a fragility factor in need of moderate protection below a peak deceleration (G) of about 85 G.

For example, precision instruments and electronic equipment typically have to be protected below a G-level rating of less than about 40 G, generally referred to as their fragility factor. Most mechanical and electrical equipment have a fragility factor typically between about 40 G and about 85 G, as discussed in more detail below.

For convenience and not by way of limitation, the article A is illustrated in FIG. 11A, in the shape of a substantially rectangular product, such as would be encountered with a laptop computer. In FIGS. 11A, 11B and 11C, each of the prestressed honeycomb pad embodiments, 324, 326, 328 and 330 are prepared from prestressed honeycomb blanks, such as 320 and 321, having the two opposed face sheets 312, 316. For example, useful prestressed honeycomb blanks can have face sheets made of kraft of about 42 pound weight with a honeycomb core of about 33 pound weight kraft and a cell width of about 0.5 inch (about 1.2 centimeters). As illustrated in FIGS. 11A, 11B and 11C, each of the prestressed honeycomb pads can be made from a conditioned honeycomb blank which is custom cut and prestressed to the desired thickness for fitting the inner packaging to the interior of the carton C, as described below, without being limited thereto.

The prestressed honeycomb pads 326 and 328 are illustrated in FIG. 11A in the form of U-shaped bumper pads each of which have been individually formed from a prestressed honeycomb blank, such as the prestressed honeycomb blank 320 shown in FIG. 11B. The prestressed honeycomb blank 320 is cut as a substantially oblong rectangular pad which is partially cushioned to a thickness of about two thirds of the original thickness of the conditioned honeycomb, for example, from about 3 inches (about 7.5 centimeters) to about 2 inches (about 5 centimeters). The length of the blank 320 is selected so that the partially cushioned face portion 322 of the bumper pad 326 contacts and protects the top T and the upper portion of the right and left sides RS, LS of the article A and that of the bumper pad 328 contacts and protects the bottom B and the lower portion of the right and left sides RS, LS of the article A.

As shown in FIG. 11B, the prestressed honeycomb blank 320 has been partially cushioned and has also been slit scored in two places through its uncushioned face portion to a depth sufficient for creating the hinges 318 (indicated by the dotted horizontal lines) at its cushioned face portion 322. The hinges 318 are preferably located at each end portion to form the three hinged pad sections, 320a, 320b and 320c, for forming a U-shaped bumper pad suitable for the inner packaging 310. The hinges 318 allow each of the bumper pad sections to be folded and placed around and with its cushioned face portion 322 in contact with the surface of a structure, such article A as illustrated in FIG. 11A. Thus, as illustrated in FIG. 11A, the prestressed honeycomb bumper pad 326 comprises the three hinged pad sections 326a, 326b and 326c of prestressed honeycomb, the cushioned faces of which protect the top and upper surfaces of the sides of the article A and the prestressed honeycomb bumper pad 328 comprises the three hinged pad sections 328a, 328b and 328c of prestressed honeycomb, the cushioned faces of which protect the bottom and lower surfaces of the sides of the article A.

By way of illustration and not by limitation, when the inner packaging 310 is assembled and nested in the carton C (as indicated by the arrow), the bumper pad section 326b contacts the top T, the bumper pad section 328b contacts the bottom B of article A, the bumper pad section 326a abuts the bumper pad section 328a and the bumper pad section 326c abuts the bumper pad section 328c.

The prestressed honeycomb bumper pads 324 and 330 are illustrated in FIG. 11A in the form of cap-shaped bumper pads each of which has been similarly formed a prestressed honeycomb blank, such as the prestressed honeycomb blank 321 shown in FIG. 11C. For this embodiment, the prestressed honeycomb blank 321 is cut as a substantially rectangular pad which has been fully cushioned to a thickness of about half of the original thickness of the conditioned honeycomb, for example, from about 3 inches (about 7.5 centimeters) to abut 1.5 inches (about 3.75 centimeters).

The prestressed honeycomb blank 321, as illustrated in FIG. 11C, is slit scored (indicated by the solid lines) in three places to a depth sufficient for forming the four hinged 318 prestressed honeycomb pad sections 321a, 321b and 321c, which can be folded into a U-shaped cap and the prestressed honeycomb pad section, 321d, which can be folded to abut against the pad section 321c. Thus, the width and length of the prestressed honeycomb blank 321 is selected and slit scored to provide the hinged cap-shaped bumper pads 324 and 330, each having four pad sections as illustrated in FIG. 11A.

Thus, when the inner packaging 310 shown in FIG. 11A is fully assembled and placed in the carton C, the fully cushioned face of the pad 324a protects the upper surface of the front face FF, and that of the pad 324d protects the upper surface of the rear face RF (not shown) of the article A, the pad section 324b abuts against the bumper pad section 326b to both further protect the top T and fill the void space at the top and the pad 324C abuts against the pad section 324d to fill the void space in the rear and further protects the upper rear face RF.

Similarly, the cushioned face of pad section 330a protects the lower surface of the front face FF and that of pad section 330d protects the lower surface of the rear face RF (not shown) of the article A, the pad section 330b abuts against the bumper pad section 328b to both fill the void space at the bottom and further protect the bottom B while the pad 330c fills the void space and further protects the lower rear face RF, when the inner packaging is nested in the carton C.

This embodiment thus provides cushioning protection against static or dynamic loads applied over each quadrant through a 360 degree arc both vertically and laterally.

The shock absorbance of another inner packaging embodiment was examined in a preliminary free fall drop test. This embodiment comprised a plurality of prestressed honeycomb blocks secured as by gluing each one directly to one surface of a corrugated support structure. The support structure was then folded around a laptop computer to which a standard accelerometer had been attached. The support structure was folded so as to place substantially all of the surfaces of the contained computer in contact with the cushioned face portions of the prestressed honeycomb blocks thus providing, in effect, a substantially rectangular box-like inner packaging lined with the prestressed honeycomb. This inner packaging was then placed in a carton and sealed.

The carton was then attached to the drop test instrument and subjected to a free fall drop from a height of about 1 meter and the acceleration wave form printout taken. The free fall drop test was started by dropping the carton onto one of its faces, the box was then rotated and the drop test repeated onto another one of its faces. This procedure was performed using various prestressed honeycomb pads embodying the principles of this invention. The test was performed at an ambient room temperature of about 23 degrees C. and at an ambient relative humidity of about 55 percent.

The peak deceleration (G) in grams (g) and duration (D) in milliseconds (ms) as measured was found to range from G-levels of about 37 g to less than about 80 g at a duration of from about 19 ms to about 25 ms. These preliminary results showed that the impact cushioning properties of inner packaging made of prestressed honeycomb pads was sufficient for protecting moderately delicate to delicate articles having a fragility factor rating of less than about 85 G's.

It is well known that moderately delicate electronic articles, such as stereo and television receivers, radios, and floppy disk drives have a fragility factor of about 60 to about 85 G's. Delicate articles, such as aircraft accessories, electric typewriters, cash registers, computer display terminals and printers and office equipment, have a fragility factor of about 40 to about 60 G's.

Figure 12:
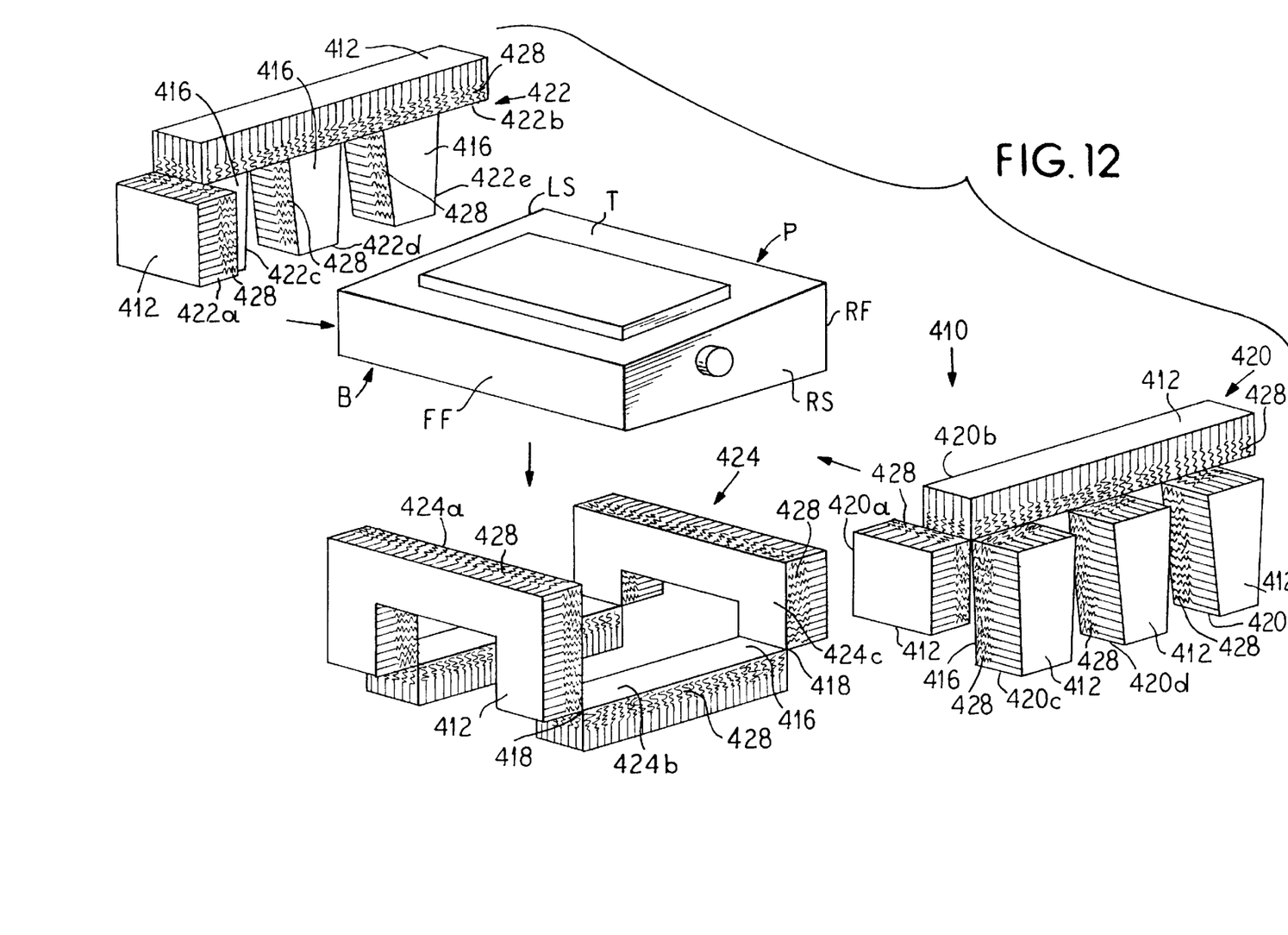
FIG. 12 is a perspective exploded view of another inner packaging embodiment illustrated as a multipiece assembly of resilient prestressed honeycomb pads custom fit for cushioning the surfaces of a computer printer.

FIG. 12 illustrates another inner packaging embodiment 410 which is suitable for protecting a computer printer. This embodiment comprises an assembly of prestressed honeycomb pads, 420, 422 and 424 but is not intended to be so limited. The assembly of pads can be prepared from a single prestressed honeycomb blank, having two face sheets, 412 and 416, each of different strengths. For example, the face sheet 412 can be of about 42 pound weight kraft and the face sheet 416 can be of about 26 pound weight kraft with cells of about 26 pound weight kraft and a width of about 0.5 inch (about 1.25 centimeters). As illustrated, the conditioned honeycomb can be prestressed to about 60 percent of its original thickness, i.e., from an original thickness of about 3 inches (about 77.5 centimeters to a thickness of about 1.75 inches (about 4.4 centimeters).

The three prestressed honeycombs pads 420, 422 and 424 can also be die cut from a single prestressed, partially cushioned honeycomb blank by the method and apparatus of this invention. The prestressed honeycomb pad 424 is illustrated as a U-shaped base pad which has been die cut from a generally rectangular prestressed honeycomb blank and further slit scored in two places to provide hinges 418 at the cushioned face portion 428. Thus, the base pad 424 comprises the three pad sections, 424a, 424b and 424c which can be folded to form the U-shaped base pad 424.

The U-shaped base pad 424 thus cushions the bottom B of the printer P when it is seated in contact with the cushioned face portion 428 of the pad section 424b (indicated by the arrow). The cushioned face portion 428 of the pad section 424a and the cushioned face portion 428 of the pad section 424c respectively come in contact with the front face FF and rear face RF of the printer P.

The prestressed honeycomb pad embodiments, 420 and 422, each provide side bumper pads for the printer P. Both of the side bumper pads 420 and 422 can be die cut from the center portion of the prestressed honeycomb blank used to form the base pad 424. In this embodiment, the side bumper pads 420 and 422 are illustrated to provide cushioning protection to the corners of the front face FF, the sides, and outer portion of the top of the printer P when they are secured with their cushioned face portions abutting against the printer after it is positioned on the base pad 424 as shown by the arrows.

For example, once printer P is cradled by the U-shaped prestressed honeycomb pad 424, the outer corners and side typically extend outside the periphery of pad. Thus, the cushioned face portion of the prestressed honeycomb bumper pad 422 is placed in contact with the printer P so that the cushioned face portion 428 of the bumper pad section 422a protects the outer front face FF, the cushioned face portion 428 of the bumper pad section 422b protects the outer portion of the top surface T and the cushioned face portions of the bumper pad sections, 422c, 422d and 422e protect the left side portion LS.

Likewise, the bumper pad 420 is positioned so that the cushioned face portion 428 of the bumper pad section 420a protects the opposed outer corner of the printer P. Thus, the cushioned face portion 428 of the bumper pad section 420b protects the opposed outer top portion, and the cushioned face portions of 420c, 420d and 420e protect the right side RS of the printer P.

As illustrated, the bumper pads 420 and 422 have been die cut and hinged to provide four vertical cushion pads and one horizontal cushion pad. As can be appreciated, the shape of the prestressed honeycomb assembly is not limited and can be modified as desired and still come within scope of this invention, as long as all of the pads have cushioned face portions and are in contact with the structure to be protected.

The shock absorbance of another inner packaging embodiment suitable for similarly protecting a printer was determined for two units using the free fall drop test described above. The preliminary results were compared against those obtained for two similar size inner packaging units of expanded polystyrene (EPS) foam subjected to the same test. The resulting G ratings from multiple impacts were as follows for the EPS and prestressed honeycomb (PH).

| Face | EPS | | PH | |
|---|---|---|---|---|
| Tested | Unit 1 | Unit 2 | Unit 1 | Unit 2 |
| Right Side | 40 | 36 | 36 | 57 |
| Left Side | 42 | 39 | 35 | 88 |
| Front | 60 | 56 | 37 | 49 |
| Rear | 72 | 75 | 57 | 76 |
| Bottom | 83 | 98 | 87 | 67 |
| Top | 98 | 92 | 42 | 94* |
| Average G Rating | 66 | | 60.5 | |

Note *Top Corner Pad twisted off

These preliminary results showed that, on average, the prestressed honeycomb inner packaging provided cushioning protection against multiple impacts comparable to or better than foam inner packaging. In further tests, prestressed honeycomb has been found to be superior to foam cushioning material.

Methods for determining the shock absorbing characteristics of materials, such as honeycomb structures, are generally found in ASTM D1596 (Standard Test Method for Shock Absorbing Characteristics of Package Cushioning Materials) and are well known to those skilled in the material testing arts. Cushion curves obtained by these methods relate the peak deceleration (G) experienced by the cushioned weight in a free fall drop to the static loading S defined as S=W/A; where W is the weight of the product and A is the support area underneath the weight (contact area between the weight and cushion). The curves are normally presented in graph form with peak deceleration (G) on the vertical axis and static loading (psi) on the horizontal axis.

Materials that show good shock absorbance have lower G values, and less dense materials are principally preferred. Once the stressed honeycomb is made, it can be further cut, or score slit to form a hinge, or be further punch cut at a preselected section to provide a prestressed protrusion point cushion. The resilient prestressed paper honeycomb structure can be cut in the shape of a pad, block or panel.

It has been found that cushioning protection is greater when the honeycomb structure is stressed to a depth of less than about half of its original thickness to provide it with a partially cushioned face portion. Additionally one of the resilient prestressed honeycomb structures can be further abutted against a second resilient prestressed honeycomb structure which has been prestressed to the same or different depth if desired for obtaining various levels of cushioning protection.

Additionally, the resilient prestressed honeycomb structure can be cut and formed to any size and shape in one step by the method and apparatus of this invention to provide a lightweight strong inner packaging having one or all of its planar surfaces cushioned. This beneficially provides substantially uniform cushioning protection of articles having a fragility factor rating of less than about 85 G's against multiple impacts.

Moreover, the foregoing inner packaging can also be formed with cavities of nearly any shape to custom fit products of various configurations and weights with the added advantage of substantially uniformly cushioning all of the surfaces of the product. Until now, the benefits of inner packaging made of paper honeycomb structures having such continuously resilient prestressed surfaces was not available.

Additionally, the resilient prestressed honeycomb structure can be secured directly to the surface of the interior walls of cartons, boxes and the like, with its cushioned face portion facing inwardly or abutting the interior walls. Alternatively, the resilient prestressed honeycomb structure can be inserted, such as in pad form, between an article and the wall of the carton or box in which it is contained to provide cushioning protection to substantially all surfaces.

The foregoing is illustrative of the principles of the invention. Further, since numerous modifications and changes will readily occur to those skilled in the art, it is not desired to limit the invention to the exact construction and operation shown and described. Accordingly, all suitable modifications and equivalents may be resorted to while still falling within the scope of the invention.

What is claimed is:

1. An apparatus for cutting and forming a resilient prestressed paper honeycomb structure of a predetermined size and shape in one step, the apparatus comprising:
   a) means for cutting through a paper honeycomb structure comprising opposed hollow-cell faces defining planar surfaces along a predetermined line to form a predetermined shape;
   b) at least one plate cooperatively associated with the cutting means, the plate being capable of compressing the paper honeycomb structure substantially continuously along at least one of its planar surfaces to form a resilient prestressed cushioned face portion; and c) means for simultaneously driving the cutting means through the honeycomb structure while laterally compressively deforming the selected planar surface to a predetermined depth, such that a prestressed honeycomb structure having a substantially continuous resilient cushioned planar surface is obtained.

2. The apparatus of claim 1 wherein the plate compressively deforms the selected planar surface to a uniform predetermined depth to form a substantially linear cushioned face portion.

3. The apparatus of claim 1 wherein the plate compressively deforms the selected planar surface to a non-uniform predetermined depth to form a non-linear cushioned face portion.

4. An apparatus for forming a resilient prestressed honeycomb structure comprising:
  a) a conveyor for conveying a honeycomb structure including opposed hollow-cell faces defining opposed planar surfaces; and
  b) a compression apparatus for compressively deforming at least a portion of one of the planar surfaces of the honeycomb structure to form a resilient prestressed cushioned face portion as the honeycomb structure is conveyed past the compression apparatus.

5. The apparatus of claim 4, wherein the compression means comprises a compression roll with a varying radius along the width thereof for forming a cavity in a portion of one of the planar surfaces of the honeycomb structure.

6. The apparatus of claim 4, wherein the compression means comprises a cylindrical compression roll having a constant radius along the width thereof for laterally compressively deforming the entire one of the planar surfaces of the honeycomb structure.

7. The apparatus of claim 6, further comprising means for varying the height of the compression roll with respect to the conveyor to vary the depth to which the one of the planar surfaces is compressively deformed.

8. The apparatus of claim 6, wherein the compression roll includes a plurality of pins extending radially outwardly from the outer surface thereof for forming perforations in the honeycomb structure as the honeycomb structure is conveyed past the compression roll.

9. The apparatus of claim 4, wherein the compression apparatus comprises a plurality of parallel compression rolls positioned above the conveyor and the honeycomb structure, each of the compression rolls being positioned at an incrementally different height with respect to the conveyor for incrementally laterally compressively deforming the one of the planar surfaces of the honeycomb structure as the honeycomb structure is conveyed past the compression apparatus.

10. The apparatus of claim 9, further comprising a roll frame supporting the compression rolls and means for adjusting the height and angular displacement of the roll frame with respect to the conveyor such that the compression rolls are positioned at incrementally different heights with respect to the conveyor for incrementally laterally compressively deforming the one of the planar surfaces of the honeycomb structure.

11. The apparatus of claim 10, wherein the means for adjusting the height and angular displacement of the roll frame comprises a roll height adjuster operatively associated with the roll frame for adjusting the height and angular displacement of the roll frame.

12. The apparatus of claim 11, wherein the roll height adjuster is operatively associated with one end of the roll frame for adjusting the height of the one end of the roll frame, the apparatus further comprising another roll height adjuster operatively associated with the other end of the roll frame for adjusting the height of the other end of the roll frame.

13. The apparatus of claim 10, further comprising means on the roll frame for independently adjusting the vertical position of each of the compression rolls.

14. The apparatus of claim 10, further comprising a support frame and a plurality of gibs secured to the support frame, the roll frame being supported within the gibs to allow for the vertical movement of the roll frame with respect to the support frame.

15. An apparatus for forming a resilient prestressed honeycomb structure comprising:
  a) a support frame;
  b) a belt for conveying a honeycomb structure, the honeycomb structure including opposed hollow-cell faces defining opposed planar surfaces;
  c) a roll frame positioned above the belt, the toll frame being mounted for pivotal displacement about the support frame;
  d) a plurality of parallel and elongate compression rolls mounted on the roll frame for compressively deforming at least a portion of one of the planar surfaces of the honeycomb structure to form a resilient prestressed cushioned face portion as the honeycomb structure is conveyed past the compression rolls; and
  e) a roll height adjuster secured to the support frame and operatively associated with the roll frame for varying the vertical and angular displacement of the roll frame with respect to the support frame and positioning the compression rolls at different heights with respect to the support frame such that when the honeycomb structure is conveyed past the compression rolls, the compression rolls incrementally compress at least a portion of one of the planar surfaces to a predetermined depth to form the resilient prestressed cushioned face portion of a prestressed honeycomb structure.

16. The apparatus of claim 15, further comprising gibs secured to the support frame, the roll frame being supported within the gibs to allow vertical and angular displacement of the roll frame with respect to the support frame.

17. The apparatus of claim 15, wherein the roll height adjuster is operatively associated with one end of the roll frame for varying the height of the one end of the roll frame, the apparatus further comprising another roll height adjuster operatively associated with the other end of the roll frame for varying the height of the other end of the roll frame.

18. The apparatus of claim 15, further comprising means on the roll frame for independently adjusting the vertical position of each of the compression rolls.

19. The apparatus of claim 15, further comprising a connector shaft and an adjustment wheel operatively associated with the roll height adjuster, the connector shaft being connected at one end to the roll height adjuster and at the other end to the adjustment wheel, the adjustment wheel being manually operable for adjusting the height of the roll height adjuster.

20. The apparatus of claim 15, wherein each of the compression rolls is cylindrical and has a constant radius along the width thereof for laterally compressively deforming the entire one of the planar surfaces of the honeycomb structure.

21. The apparatus of claim 15, wherein each of the compression rolls has a varying radius along the width thereof for forming a cavity in a portion of one of the planar surfaces of the honeycomb structure.

* * * * *